United States Patent
Wu et al.

(10) Patent No.: US 12,249,866 B2
(45) Date of Patent: Mar. 11, 2025

(54) STATOR STRUCTURE

(71) Applicant: Delta Electronics, Inc., Taoyuan (TW)

(72) Inventors: Chun-Nan Wu, Taoyuan (TW);
Yang-Hsin Lee, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 308 days.

(21) Appl. No.: 17/948,776

(22) Filed: Sep. 20, 2022

(65) Prior Publication Data

US 2023/0318364 A1    Oct. 5, 2023

(30) Foreign Application Priority Data

Mar. 29, 2022  (CN) .......................... 202210325935.1

(51) Int. Cl.
*H02K 1/04*           (2006.01)
*H02K 1/14*           (2006.01)

(52) U.S. Cl.
CPC ............... *H02K 1/04* (2013.01); *H02K 1/146* (2013.01)

(58) Field of Classification Search
CPC ............ H02K 1/04; H02K 1/146; H02K 1/14; H02K 5/10; H02K 5/04; H02K 5/08; H02K 15/10; H02K 15/12; H02K 15/02; H02K 15/022; H02K 3/44
See application file for complete search history.

(56) References Cited

U.S. PATENT DOCUMENTS

| | | | | |
|---|---|---|---|---|
| 7,635,934 B2 * | 12/2009 | Zhu | .......................... | H02K 1/187 |
| | | | | 310/88 |
| 7,667,359 B2 * | 2/2010 | Lee | ........................... | H02K 5/04 |
| | | | | 310/43 |
| 8,492,939 B2 * | 7/2013 | Hasegawa | ............. | F04D 29/023 |
| | | | | 310/58 |
| 8,643,232 B2 * | 2/2014 | Hung | ..................... | H02K 15/12 |
| | | | | 310/43 |
| 8,760,018 B2 * | 6/2014 | Liu | ......................... | H02K 11/33 |
| | | | | 310/43 |
| 8,922,076 B2 * | 12/2014 | Hsieh | ..................... | H02K 5/128 |
| | | | | 310/43 |
| 8,987,958 B2 * | 3/2015 | Chen | ........................ | H02K 5/10 |
| | | | | 310/43 |
| 9,533,374 B2 * | 1/2017 | Chang | ..................... | B23K 26/24 |
| 10,424,987 B2 * | 9/2019 | Shen | ........................ | H02K 5/02 |
| 10,951,097 B2 | 3/2021 | Fung et al. | | |
| 11,043,871 B2 * | 6/2021 | Horng | ....................... | H02K 5/10 |

(Continued)

FOREIGN PATENT DOCUMENTS

CN       202550807 U  *  12/2012
CN       203774888 U  *   8/2014

(Continued)

*Primary Examiner* — Edgardo San Martin
(74) *Attorney, Agent, or Firm* — KIRTON McCONKIE; Evan R. Witt

(57) ABSTRACT

A stator structure includes a silicon steel sheet, a first plastic material and a second plastic material. The silicon steel sheet has a plurality of pole faces. The first plastic material covers on the silicon steel sheet. The second plastic material forming on the first plastic material. The first plastic material covered on the plurality of the pole faces is not covered by the second plastic material. The thermal conductivity of the first plastic material is higher than that of the second plastic material.

11 Claims, 5 Drawing Sheets

(56) References Cited

U.S. PATENT DOCUMENTS

| | | | | |
|---|---|---|---|---|
| 2007/0085426 A1* | 4/2007 | Lee | ............................ | H02K 1/04 |
| | | | | 310/43 |
| 2007/0145842 A1* | 6/2007 | Zhu | ........................ | F04D 29/582 |
| | | | | 310/43 |
| 2011/0239441 A1* | 10/2011 | Ho | .......................... | H02K 15/12 |
| | | | | 29/596 |
| 2023/0238847 A1* | 7/2023 | Lu | ............................ | H02K 3/44 |
| | | | | 310/45 |

FOREIGN PATENT DOCUMENTS

| | | | | |
|---|---|---|---|---|
| CN | 206478032 U | * | 9/2017 | |
| CN | 110138154 A | | 8/2019 | |
| CN | 112018908 A | * | 12/2020 | |
| CN | 212726586 U | * | 3/2021 | |
| TW | 200952578 A | * | 12/2009 | |
| TW | M451742 U | * | 4/2013 | |
| TW | I418118 B | | 12/2013 | |

* cited by examiner

STATOR STRUCTURE

CROSS-REFERENCE TO RELATED APPLICATION

This application claims priority to China Patent Application No. 202210325935.1, filed on Mar. 29, 2022. The entire contents of the above-mentioned applications are incorporated herein by reference for all purposes.

FIELD OF THE INVENTION

The present disclosure relates to a stator structure, and more particularly to a stator structure with two different plastic materials.

BACKGROUND OF THE INVENTION

The traditional stator of motor is mainly composed of silicon steel components, an insulating carrier, windings and a circuit board. After the silicon steel components are assembled with the insulating carrier, the windings are wound thereon and assembled with the circuit board. After that, the assembled structure is putted into a jig to fill with glue, and then puts the jig with the assembled structure into the oven for baking. Finally, take it out after it is cured, so that the assembled structure is completely sealed by the cured glue, and the stator is completely formed.

However, during the glue filling procedure of the prior art, due to the gap between the jig and a plurality of pole faces of the silicon steel components are too small, and the glue also has its certain viscosity, it is difficult to be evenly distributed in such small gap during the glue filling procedure, which may result in uneven thickness after curing. In some prior arts, there may be a lack of glue in this gap, after the glue is cured, some air holes may be formed on the pole faces of the silicon steel components, and these air holes will affect the waterproof and dustproof performance of the motor. Moreover, if moisture enters into the motor through these air holes, the silicon steel components may rust, so as to affect the motor performance. Besides, as mentioned above, when the thickness of the glue is uneven, the glue may cover some residual gas inside the motor. During the motor is operating, the gas may expand and bulge due to the high temperature, which will result in air bubbles formed on the surface of the pole faces of the silicon steel components. In other words, the glue cured on the pole faces of the silicon steel components not only have problems such as uneven thickness and air holes, but also have bulging air bubbles. In this circumstance, during the motor is operating, these air bubbles may interfere with the rotor and result in abnormality, so that the product stability is affected.

In brief, since the stator of the prior art is only produced by the glue filling procedure, which may result in that the glue cured on the pole faces of the silicon steel components has uneven thickness, air holes, and air bubbles, which will directly affect the efficacy of waterproof, dustproof, the operation performance of the motor, and the product stability. Therefore, there is a need of providing a stator structure to obviate the drawbacks encountered from the prior arts.

SUMMARY OF THE INVENTION

It is an object of the present disclosure to provide a stator structure. The stator structure includes a silicon steel sheet, a first plastic material and a second plastic material. The first plastic material with higher thermal conductivity covers on the silicon steel sheet and its pole faces, and the second plastic material forms on the first plastic material. However, a portion of the first plastic material covered on the plurality of the pole faces is not covered by the second plastic material. When a motor uses the stator structure of the present disclosure, the effect of increasing the upper limit of the rotational speed can be obtained.

In accordance with an aspect of the present disclosure, there is provided a stator structure including a silicon steel sheet, a first plastic material and a second plastic material. The silicon steel sheet has a plurality of pole faces. The first plastic material covers on the silicon steel sheet. The second plastic material forming on the first plastic material. The portion of the first plastic material covered on the plurality of the pole faces is not covered by the second plastic material. The thermal conductivity of the first plastic material is higher than that of the second plastic material.

In an embodiment, the thermal conductivity difference between the first plastic material and the second plastic material is not less than 0.5 W/m·K.

In an embodiment, the fluidity of the second plastic material is higher than that of the first plastic material.

In an embodiment, the hardness of the first plastic material is higher than that of the second plastic material.

In an embodiment, the silicon steel sheet is covered by the first plastic material through an injection molding process, the second plastic material is potted on the first plastic material, and the portion of the first plastic material on the plurality of pole faces is not covered by the second plastic material.

In an embodiment, the first plastic material completely covers the silicon steel sheet to form an insulating carrier, and the insulating carrier has a winding portion.

In an embodiment, the stator structure further comprises at least one winding and a circuit board, wherein the at least one winding is wound on the winding portions of the insulating carrier and assembled with the circuit board.

In accordance with another aspect of the present disclosure, there is provided a stator structure including a silicon steel sheet, a first plastic material and a second plastic material. The silicon steel sheet has a plurality of pole faces. The first plastic material covers on the silicon steel sheet. The second plastic material forms on the first plastic material. The portion of the first plastic material covered on the plurality of the pole faces is not covered by the second plastic material. The hardness of the first plastic material is higher than that of the second plastic material.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
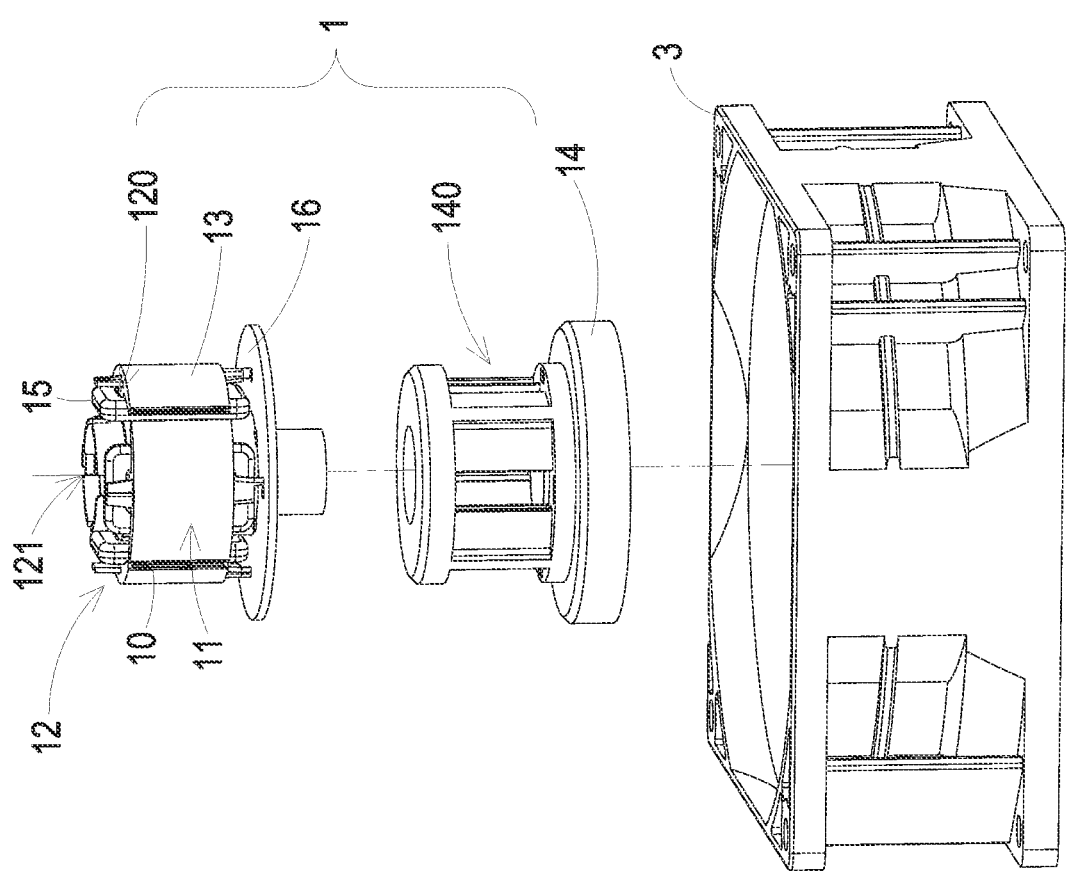
FIG. 1 is a schematic exploded view illustrating a stator structure and a fan frame before assembly according to an embodiment of the present disclosure.

FIG. 1 is a schematic exploded view illustrating a stator structure and a fan frame before assembling according to an embodiment of the present disclosure. As shown in FIG. 1, the stator structure 1 of the present disclosure is preferably applied to an external-rotor motor and assembled in the fan frame 3. The stator structure 1 includes a silicon steel sheet 10, a first plastic material 13, a second plastic material 14, at least one winding 15 and a circuit board 16. In this embodiment, the silicon steel sheet 10 has a plurality of pole faces 11, and the first plastic material 13 covers on the silicon steel sheet 10 and the plurality of pole faces 11. The second plastic material 14 forms on the first plastic material 13, while a portion of the first plastic material 13 covered on the plurality of the pole faces 11 is not covered by the second plastic material 14. In the embodiment, the thermal conductivity of the first plastic material 13 is higher than that of the second plastic material, or the hardness of the first plastic material 13 is higher than that of the second plastic material 14, but not limited thereto. When a motor uses the stator structure 1 of the present disclosure, the effect of increasing the upper limit of the rotational speed can be obtained.

Figure 2:
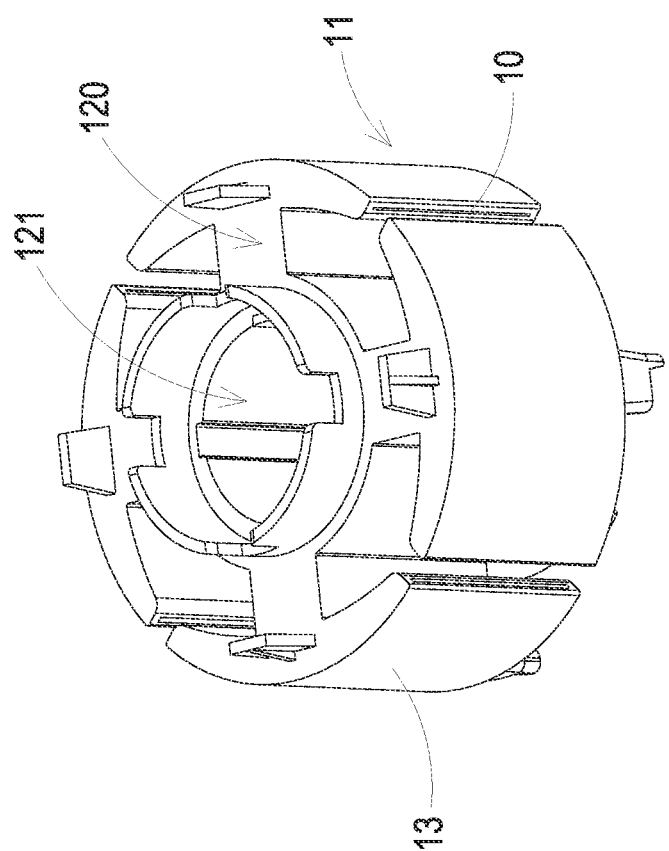
FIG. 2 is a schematic perspective view illustrating an insulating carrier of the stator structure of FIG. 1.
Figure 3:
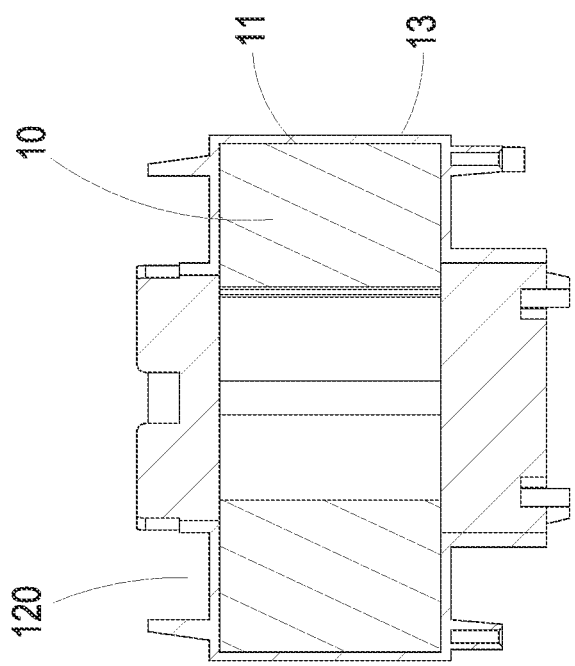
FIG. 3 is a cross-sectional view illustrating the insulating carrier of FIG. 2.

FIG. 2 is a schematic perspective view illustrating an insulating carrier of the stator structure of FIG. 1. FIG. 3 is a cross-sectional view illustrating the insulating carrier of FIG. 2. As shown in FIG. 2 and FIG. 3, in the embodiment, the first plastic material 13 completely covers the silicon steel sheet 10 and the plurality of pole faces 11 of the silicon steel sheet 10, but not limited to. In some embodiments, the silicon steel sheet 10 is covered by the first plastic material 13 through an injection molding procedure, so that the insulating carrier 12 is formed by injecting the first plastic material 13 with high pressure to closely adhere to the surface of the silicon steel sheet 10. Through the high pressure injection molding procedure, the first plastic material 13 can be rapidly hardened, and a thin and uniform covering layer is formed on the pole faces 11 of the silicon steel sheet 10, so that the thickness is uniform, and there are no defects such as air bubbles or air holes. In other embodiments, the first plastic material 13 may be but not limited to be a plastic material with high hardness, high thermal conductivity or low fluidity. Take this embodiment as an example, the first plastic material 13 can be but not limited to be nylon, and the hardness is Shore D 86, but not limited thereto.

Figure 5:
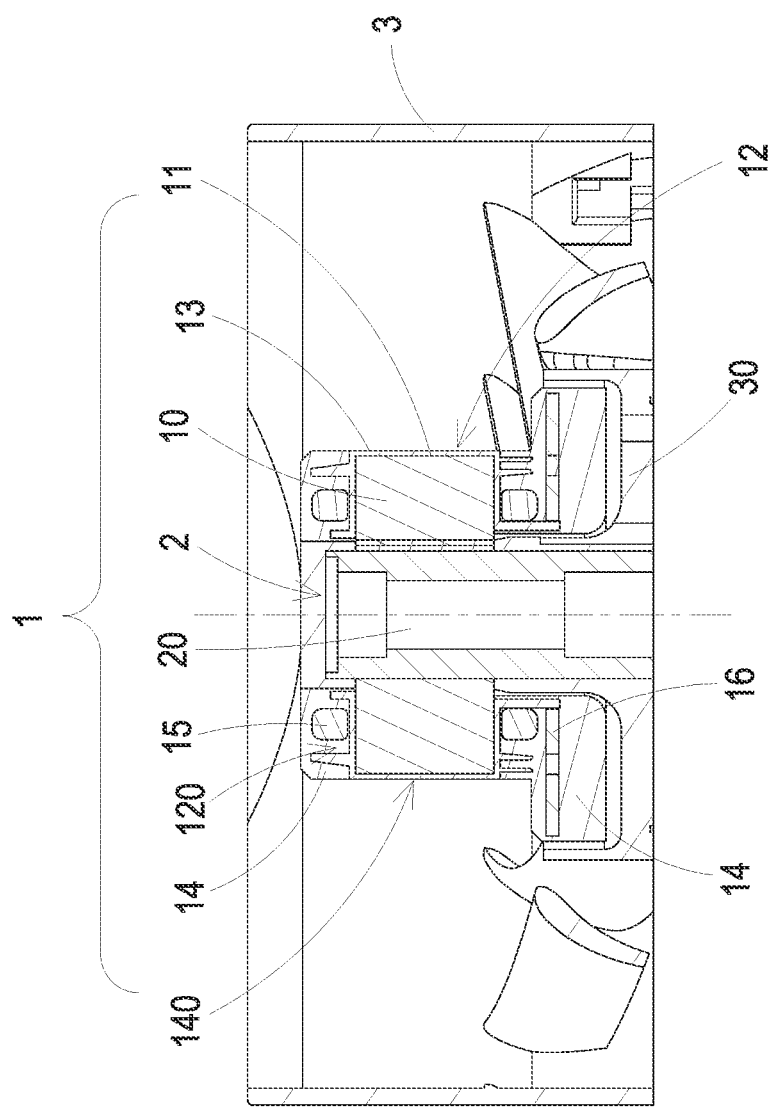
FIG. 5 is a cross-sectional view illustrating the stator structure and the fan frame of FIG. 4.

Please refer to FIG. 1, FIG. 2 and FIG. 3. In the embodiment, a mold is provided to conduct the injection molding process, so that the first plastic material 13 is injected and completely covered on the silicon steel sheet 10, and the insulating carrier 12 is formed. As shown in FIG. 2 and FIG. 3, the insulating carrier 12 comprises a plurality of winding portions 120 and a channel 121. The plurality of winding portions 120 are mainly used for allowing at least one winding 15 to be wound thereon, and the channel 121 is for a bearing unit 2 and its rotating shaft 20 (as shown in FIG. 5) to be correspondingly arranged therein. As shown in FIG. 1, when the first plastic material 13 is injected and covered on the silicon steel sheet 10 by the injection molding process, the insulating carrier 12 can be formed. After that, the at least one winding 15 is wound on the winding portions 120 of the insulating carrier 12 and assembled with the circuit board 16. After the assembling process is completed, the assembled structure is placed into a motor jig, so as to conduct a glue filling procedure. Namely, the second plastic material 14 is correspondingly filled into the motor jig, so that the second plastic material 14 is potted and formed on the first plastic material 13, wherein the portion of the first plastic material 13 on the pole faces 11 is not covered by the second plastic material 14. As shown in FIG. 1, the cured second plastic material 14 has a plurality of windows 140, and the plurality of windows correspond to the plurality of pole faces 11 of the silicon steel sheet 10, so that the portion of the first plastic material 13 on the pole face 11 is not covered by the second plastic material 14. Take this embodiment as an example, the second plastic material 14 is a mixture material of Polyurethane material with two different hardness, and the hardness can be but not limited to be Shore A 84 and Shore D 53.

Figure 4:
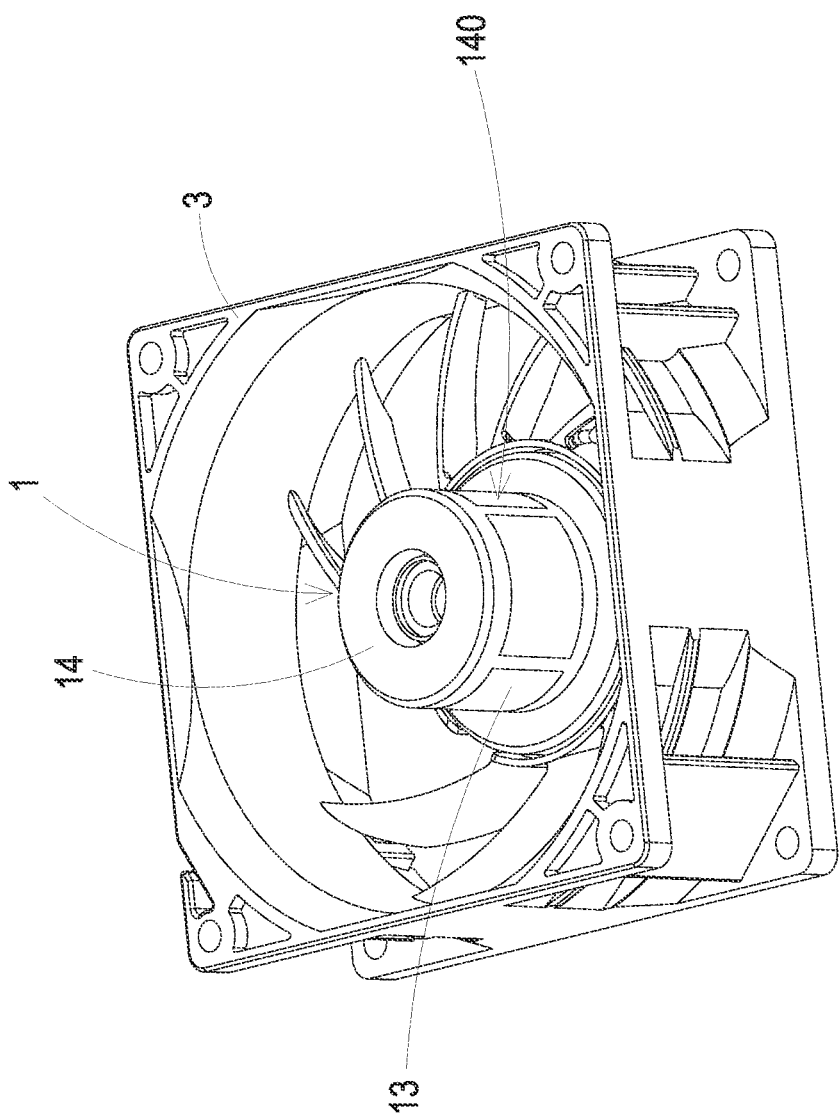
FIG. 4 is a schematic perspective view illustrating the stator structure and the fan frame after assembly of FIG. 1.

Please refer to FIG. 4 and FIG. 5. FIG. 4 is a schematic perspective view illustrating the stator structure and the fan frame after assembly of FIG. 1. FIG. 5 is a cross-sectional view illustrating the stator structure and the fan frame of FIG. 4. As mentioned above, after the second plastic material 14 potted and formed on the first plastic material 13, the stator structure 1 is formed. As shown in FIG. 4 and FIG. 5, the formed stator structure 1 sleeves on the bearing unit 2, and the rotating shaft 20 is correspondingly disposed within the channel 121 of the silicon steel sheet 10 of the stator structure 1, and then arranged on the base 30 of the fan frame 3, so as to complete the assembly of the stator structure 1 and the fan frame 3. As shown in FIG. 4, in the appearance of the formed stator structure 1, the second plastic material 14 and a part of the first plastic material 13 can be seen, wherein the visible parts of the first plastic material 13 are located on the windows 140, which correspond to the pole faces 11 of the silicon steel sheet 10. As shown in the cross-sectional view of FIG. 5, the silicon steel sheet 10 of the stator structure 1 is completely covered by the first plastic material 13 to form the insulating carrier 12, and the winding portions 120 are for the plurality of windings 15 to be wound thereon. As mentioned above, after the plurality of winding 15 wound on the winding portions 120 of the insulating carrier 12, they are correspondingly assembled and electrically couples with the circuit board 16. Then, the assembled structure is placed into the motor jig to conduct the glue filling procedure, so that the second plastic material 14 is filled into the motor jig. More specifically, through the high fluidity of the second plastic material 14, the second plastic material 14 completely covers the circuit board 16, the plurality of windings 15 and a part of the first plastic material 13, and only exposes the first plastic material 13 through the plurality of windows 140 corresponding to the pole faces 11 of the silicon steel sheet 10. Since the second plastic material 14 has relatively soft hardness, it can provide better coverage and protection for the circuit board 16. Besides, under the temperature change, the second plastic material 14 can effectively absorb the expansion and contraction of the electronic components, so that the electronic components disposed on the circuit board 16 will not be damaged due to the internal stress caused by the temperature change, thereby providing complete and effective protection. In addition, when a motor uses the stator structure 1 of the present disclosure, the effect of increasing the upper limit of the rotational speed can be obtained.

Moreover, due to the first plastic material 13 has a higher thermal conductivity than that of the second plastic material 14, the first plastic material 13 can quickly dissipate the heat generated from the plurality of windings 15 wound on the winding portions 120 of the insulating carrier 12, wherein the heat is dissipated from the exposed parts of the first plastic material 13. In this embodiment, the thermal conductivity difference between the first plastic material and the second plastic material is not less than 0.5 W/m·K, but not limited to. Certainly, the second plastic material 14 also has a certain thermal conductivity, but compared with the first plastic material 13, it mainly has higher fluidity, so as to cover most of the stator structure 1. Consequently, the efficacy of waterproof and dustproof of the stator structure 1 is achieved by the covering of the first plastic material 13 and the second plastic material 14. In comparison, the hardness of the first plastic material 13 is higher than the second plastic material 14, however, the fluidity of the second plastic material 14 is higher than the first plastic material 13.

From the above descriptions, the present disclosure provides a stator structure. The stator structure includes a silicon steel sheet, a first plastic material and a second plastic material. The first plastic material covers on the silicon steel sheet and its pole faces, and the second plastic material forms on the first plastic material. However, the portion of the first plastic material covered on the plurality of the pole faces is not covered by the second plastic material. The first plastic material is formed through an injection molding procedure. The second plastic material is form through a glue filling procedure. Due to the characteristics of the first plastic material has a higher thermal conductivity than the second plastic material, the first plastic material has higher hardness than the second plastic material, and the second plastic material has higher fluidity than the first plastic material, etc., the first plastic material covered on the pole faces of the silicon steel sheet can be evenly distributed, and the problems of the air holes or air bubbles can also be avoided. Consequently, the stator structure of the present disclosure can achieve the efficacy of enhancing heat dissipation, waterproof, dustproof, and increasing the product stability and reliability. Consequently, when a motor uses the stator structure of the present disclosure, the effect of increasing the upper limit of the rotational speed can be obtained.

While the disclosure has been described in terms of what is presently considered to be the most practical and preferred embodiments, it is to be understood that the disclosure needs not be limited to the disclosed embodiment.

What is claimed is:

1. A stator structure, comprising:
a silicon steel sheet having a plurality of pole faces;
a first plastic material completely covering on the silicon steel sheet; and
a second plastic material forming on the first plastic material;
wherein a portion of the first plastic material covered on the plurality of the pole faces is not covered by the second plastic material, and the thermal conductivity of the first plastic material is higher than that of the second plastic material.

2. The stator structure according to claim 1, wherein the thermal conductivity difference between the first plastic material and the second plastic material is not less than 0.5 W/m·K.

3. The stator structure according to claim 1, wherein the fluidity of the second plastic material is higher than that of the first plastic material.

4. The stator structure according to claim 1, wherein the hardness of the first plastic material is higher than that of the second plastic material.

5. The stator structure according to claim 1, wherein the silicon steel sheet is covered by the first plastic material through an injection molding process, the second plastic material is potted on the first plastic material, and the portion of the first plastic material on the plurality of pole faces is not covered by the second plastic material.

6. The stator structure according to claim 1, wherein the first plastic material completely covers the silicon steel sheet to form an insulating carrier, and the insulating carrier has a winding portion.

7. The stator structure according to claim 6, further comprises at least one winding and a circuit board, wherein the at least one winding is wound on the winding portions of the insulating carrier and assembled with the circuit board.

8. A stator structure, comprising:
a silicon steel sheet having a plurality of pole faces;
a first plastic material completely covering on the silicon steel sheet; and
a second plastic material forming on the first plastic material;
wherein a portion of the first plastic material covered on the plurality of the pole faces is not covered by the second plastic material, and the hardness of the first plastic material is higher than that of the second plastic material.

9. The stator structure according to claim 8, wherein the silicon steel sheet is covered by the first plastic material through an injection molding process, the second plastic material is potted on the first plastic material, and the portion of the first plastic material on the plurality of pole faces is not covered by the second plastic material.

10. The stator structure according to claim 8, wherein the first plastic material completely covers the silicon steel sheet to form an insulating carrier, and the insulating carrier has a winding portion.

11. The stator structure according to claim 10, further comprises at least one winding and a circuit board, wherein the at least one winding is wound on the winding portion of the insulating carrier and assembled with the circuit board.

* * * * *